(12) United States Patent
Xing et al.

(10) Patent No.: US 9,851,604 B2
(45) Date of Patent: Dec. 26, 2017

(54) DISPLAY SUBSTRATE AND MANUFACTURING METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongyan Xing, Beijing (CN); Hao Wu, Beijing (CN); Yanyan Yin, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 138 days.

(21) Appl. No.: 14/354,243

(22) PCT Filed: Nov. 28, 2013

(86) PCT No.: PCT/CN2013/088005
§ 371 (c)(1),
(2) Date: Apr. 25, 2014

(87) PCT Pub. No.: WO2014/206000
PCT Pub. Date: Dec. 31, 2014

(65) Prior Publication Data
US 2015/0085240 A1 Mar. 26, 2015

(30) Foreign Application Priority Data

Jun. 26, 2013 (CN) .......................... 2013 1 0259729

(51) Int. Cl.
*G02F 1/1339* (2006.01)
*G02F 1/1333* (2006.01)
*G02F 1/1341* (2006.01)

(52) U.S. Cl.
CPC .......... *G02F 1/1339* (2013.01); *G02F 1/1333* (2013.01); *G02F 1/1341* (2013.01)

(58) Field of Classification Search
CPC .................................................... G02F 1/1339
(Continued)

(56) References Cited

U.S. PATENT DOCUMENTS 5,742,006 A * 4/1998 Grupp ................... G02F 1/1339
174/525
6,018,380 A * 1/2000 Hu ........................ G02F 1/1339
349/153

(Continued)

FOREIGN PATENT DOCUMENTS

CN 101441349 A 5/2009
CN 101625486 A 1/2010
(Continued)

OTHER PUBLICATIONS

International Search Report dated Mar. 4, 2014; PCT/CN2013/088005.
(Continued)

*Primary Examiner* — Sang V Nguyen
(74) *Attorney, Agent, or Firm* — Ladas & Parry LLP

(57) ABSTRACT

Embodiments of the invention provide a display substrate and a manufacturing method thereof, and a display device. The display substrate includes a display region and a sealant coating region provided outside the display region, and the sealant coating region is provided with a groove to limit a sealant.

12 Claims, 2 Drawing Sheets

(58) Field of Classification Search
USPC ........................................................ 349/153
See application file for complete search history.

(56) References Cited

U.S. PATENT DOCUMENTS

| | | | | |
|---|---|---|---|---|
| 2004/0004434 | A1* | 1/2004 | Nishi | H01L 27/322 |
| | | | | 313/506 |
| 2005/0285354 | A1* | 12/2005 | Hosokawa | F16J 15/123 |
| | | | | 277/641 |
| 2007/0024796 | A1* | 2/2007 | Suzuki | G02F 1/1341 |
| | | | | 349/153 |
| 2007/0146568 | A1* | 6/2007 | Yamazaki | G02F 1/13394 |
| | | | | 349/43 |
| 2007/0146598 | A1* | 6/2007 | Yokokawa | G02F 1/1337 |
| | | | | 349/123 |
| 2007/0153224 | A1 | 7/2007 | Jung | |
| 2008/0137022 | A1* | 6/2008 | Komeno | G02F 1/1337 |
| | | | | 349/153 |
| 2008/0252838 | A1* | 10/2008 | Chan | G02F 1/1339 |
| | | | | 349/153 |
| 2010/0007842 | A1* | 1/2010 | Terao | G02F 1/1339 |
| | | | | 349/153 |
| 2010/0225875 | A1* | 9/2010 | Wang | G02F 1/1339 |
| | | | | 349/160 |
| 2013/0135549 | A1* | 5/2013 | Wen | G02F 1/1339 |
| | | | | 349/42 |
| 2013/0342889 | A1* | 12/2013 | Kim | G02B 26/005 |
| | | | | 359/290 |

FOREIGN PATENT DOCUMENTS

| | | | | |
|---|---|---|---|---|
| CN | 202083863 | * | 12/2011 | ........... G02F 1/1335 |
| CN | 202083863 | U | 12/2011 | |
| CN | 102411227 | A | 4/2012 | |
| CN | 102540583 | A | 7/2012 | |
| CN | 202453616 | U | 9/2012 | |

OTHER PUBLICATIONS

International Preliminary Report on Patentability Appln. No. PCT/CN2013/088005, dated Dec. 29, 2015.
First Chinese Office Action dated Jul. 5, 2016; Appln. No. 201310259729.6.
Second Chinese Office Action dated Mar. 8, 2017; Appln. No. 201310259729.6.

* cited by examiner

DISPLAY SUBSTRATE AND MANUFACTURING METHOD THEREOF, AND DISPLAY DEVICE

BACKGROUND

Embodiments of the invention relate to a display substrate and a manufacturing method thereof, and a display device.

TECHNICAL FIELD

Liquid crystal display device plays a very important role in modern life, and a liquid crystal panel is a main portion of the liquid crystal display device. In the case that two prepared substrates (for example, an array substrate and an opposite substrate) are aligned and bonded with each other to obtain the liquid crystal panel, it needs to coat a sealant on one of the two substrates and drop liquid crystal on the other of the two substrate before the two substrates are aligned and bonded with each other.

Conventional sealant coating technology is of stroke-type coating, and the stroke-type coating employs a sealant coating apparatus shown in FIG. 1. This sealant coating apparatus directly coats the sealant on the substrate. The stroke-type coating has the following problems: (1) the coating stability is poor, and the width of the sealant is not uniform and the sealant is easily wasted; (2) the sealant hanging and/or the sealant breakage easily occur, which can cause that the liquid crystal is polluted and the liquid crystal pierces into the sealant; and (3) the coating speed is relatively slow.

SUMMARY

According to one aspect of the invention, there is provided a display substrate. The display substrate comprises a display region and a sealant coating region provided outside the display region. The sealant coating region is provided with a groove to limit a sealant.

For example, the groove is provided in the sealant coating region in a form of "-" shape, "L" shape or "☐" shape.

For example, the groove is of "☐" shape, and an inner edge of the "☐" shape groove is connected end to end to form a closed rectangle surrounding the display region of the display substrate.

For example, an outer edge of the "☐" shape groove comprises at least one opening for injecting the sealant into the groove.

For example, a cross section of the groove has a structure which is wide at a top and narrow at a bottom.

For example, the cross section of the groove has the structure of inverted trapezoid or inverted taper.

For example, the groove is one or more.

According to another aspect of the invention, there is provided a display device. The display device comprises the above display substrate.

According to still another aspect of the invention, there is provided a manufacturing method of a display substrate. The display substrate comprises a display region and a sealant coating region provided outside the display region, and the manufacturing method comprises a step of forming a groove in the sealant coating region of the display substrate to limit a sealant.

For example, the step of forming the groove in the sealant coating region of the display substrate to limit the sealant comprises: etching the display substrate to form the groove in the sealant coating region of the display substrate.

For example, the etching is a dry etching.

For example, the step of forming the groove in the sealant coating region of the display substrate to limit the sealant comprises: forming barrier walls opposite to each other in the sealant coating region of the display substrate so that the groove is formed between the opposite barrier walls.

For example, the barrier walls are formed by SiNx.

For example, the barrier walls are formed by using a same material as a spacer or a black matrix that is provided on the display substrate, and the barrier walls are formed at a same time as the spacer or the black matrix that is provided on the display substrate.

For example, a height of the barrier walls is not higher than that of the spacer or black matrix that is provided on the display substrate.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
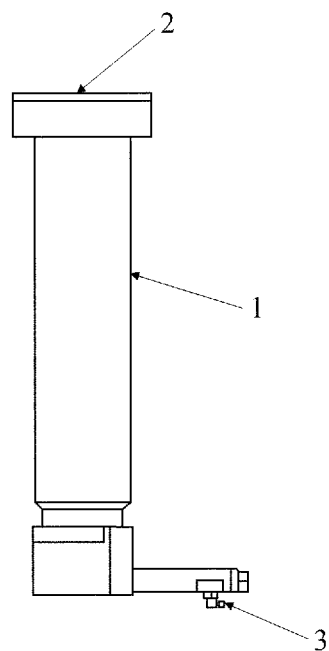
FIG. 1 is a schematic view illustrating a conventional sealant coating apparatus.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a display substrate. The display substrate comprises a display region and a sealant coating region provided outside the display region, and the sealant coating region is provided with a groove to limit a sealant. The display substrate may be any substrate that requires coating sealant thereon, such as an array substrate, an opposite substrate and the like. For example, the opposite substrate is a color filter substrate. By providing the groove, the sealant may be coated by using an injection process. In this case, the sealant coating efficiency can be greatly improved, the problems such as sealant hanging, sealant breakage and poor coating uniformity in the conventional stroke-type coating can be solved, and thus the product yield can be increased and the manufacture efficiency can be improved.

For example, the groove may be one or more.

For example, the groove is provided in the sealant coating region in a form of "-" shape, "L" shape or "☐" shape. Preferably, the groove is of the "☐" shape. In this case, an inner edge of the "☐" shape groove is connected end to end to form a closed rectangle surrounding the display region of the display substrate, and an outer edge of the "☐" shape groove comprises at least one opening for injecting the sealant into the groove. In the case that the inner edge of the groove forms the closed rectangle surrounding the display region of the display substrate, the defects that the liquid crystal is polluted, the liquid crystal pierces into the sealant and the like can be efficiently prevented, and thus the product yield can be improved. In addition, by providing the opening at the outer edge of the groove, the injection of the sealant can be facilitated and the coating uniformity of the sealant can be improved. The opening may be one or more. The opening may be provided at four corners of the "☐" shape groove, or the opening may be provided on a side of the "☐" shape groove.

It should be noted that the groove may be provided in a curve form. When the groove is provided in the curve form, the undesired phenomena such as overflow during coating the sealant can be avoided, and thus the coating uniformity and the coating reliability of the sealant can be improved.

For example, a cross section of the groove has a structure which is wide at a top and narrow at a bottom. For example, the cross section of the groove has the structure of inverted trapezoid or inverted taper or other similar structures. In the case that the cross section of the groove has the structure which is wide at the top and narrow at the bottom, the adhesive area of the sealant can be increased so that the adhesion between the two substrates bonded to each other can be more strong, and thus the stability and reliability of the resultant device can be improved.

Figure 2:
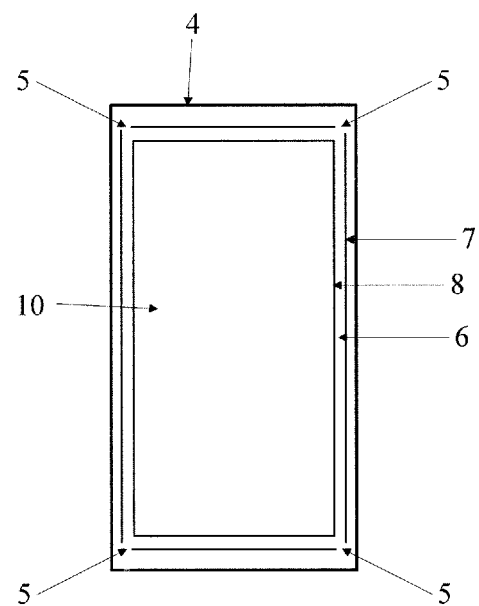
FIG. 2 is a schematic view illustrating a display substrate according to an embodiment of the invention.

FIG. 2 is a schematic view illustrating the display substrate according to the embodiment of the invention, wherein the "☐" shape groove 6 is shown as an example. As shown in FIG. 2, the "☐" shape groove 6 surrounding the display region 10 is provided in the sealant coating region that is outside the display region 10. The groove 6 may be formed by forming a SiNx film on the display substrate and then etching the SiNx film. Alternatively, the groove 6 may be directly formed by etching the display substrate. It can be seen from FIG. 2 that the inner edge 8 of the groove 6 is connected end to end and forms the closed rectangle surrounding the display region 10. Accordingly, the sealant can be avoided from overflowing toward the display region 10 of the substrate, and the defects that the liquid crystal is polluted and the liquid crystal pierces into the sealant can be prevented.

Further, as shown in FIG. 2, the openings 5 are provided on the outer edge 7 of the groove to be used as the injection inlet of the sealant, and more specifically, the openings 5 are provided at four corners of the "☐" shape groove 6. It should be noted that the opening 5 may be provided at any other position of the groove 6 as the injection inlet of the sealant. For example, the opening 5 may be provided on any side of the "☐" shape groove 6, as long as the sealant can be smoothly injected into the groove 6 by the opening 5.

During coating the sealant, the sealant coating apparatus shown in FIG. 1 may be used, and the sealant is injected into the groove 6 by the opening 5 without performing the conventional stroke-type coating. Since the groove 6 is concave, the sealant injected into the groove 6 does not overflow. Accordingly, the problems such as the wasting of the sealant, the pollution of the liquid crystal and so on can be avoided.

Figure 3:
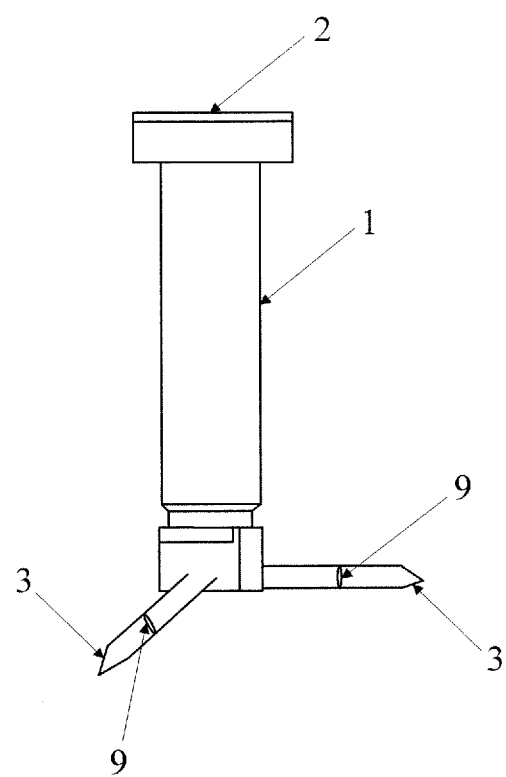
FIG. 3 is a schematic view illustrating a sealant coating apparatus according to an embodiment of the invention.

In addition, the sealant coating apparatus shown in FIG. 3 may also be used, and the sealant is injected into the groove 6 by the opening 5. The sealant coating apparatus shown in FIG. 3 comprises two nozzles 3, and the two nozzles 3 may be perpendicular to each other or form other angle therebetween. In addition, the angle between the two nozzles 3 may be adjusted according the position of the openings 5. The sealant is injected into the groove 6 by the two nozzles at the same time, and thus the sealant coating efficiency can be improved. Of course, the sealant coating apparatus shown in FIG. 3 may further comprise more than two nozzles 3, for example, the number of the nozzles 3 is the same as that of the openings 5 of the groove, and the position of the nozzles 3 can be adjusted to correspond to the position of the openings 5 of the groove whatever the number of the nozzles 3. In addition, a valve 9 may be provided in the nozzle 3, to control the starting and the stopping of the sealant injection and control the flow rate and flow amount of the sealant.

An embodiment of the invention provides a display device, and the display device comprises the above display substrate. Since the groove is provided to limit the sealant, the sealant can be coated by the injection process. Accordingly, the manufacture efficiency can be improved, the sealant can be saved, the problems such as the sealant hanging, the sealant breakage and poor coating uniformity in the conventional stroke-type coating can be solved, and the defects that the liquid crystal is polluted, the liquid crystal pierces into the sealant and the like can be efficiently prevented. Therefore, the product yield can be increased and the manufacture efficiency can be improved.

An embodiment of the invention provides a method of manufacturing the display substrate. The display substrate comprises the display region and the sealant coating region provided outside the display region, and the manufacturing method comprise a step of forming the groove in the sealant coating region of the display substrate to limit the sealant.

For example, the step of forming the groove in the sealant coating region of the display substrate to limit the sealant comprises: etching the display substrate to form the groove in the sealant coating region of the display substrate. For example, the etching is a dry etching.

The step of forming the groove in the sealant coating region of the display substrate by etching may be performed before or after forming other structures (such as, a thin film transistor array or a color resin layer) of the display substrate, or may be performed during the process of forming other structures of the display substrate. For example, this step may be performed during etching a gate insulation layer, a passivation layer and the like depending on the design of the mask plate.

For example, the step of forming the groove in the sealant coating region of the display substrate to limit the sealant comprises: forming barrier walls opposite to each other in the sealant coating region of the display substrate. The groove is formed between the opposite barrier walls.

For example, the barrier wall may be formed by using materials such as SiNx and the like, or the barrier wall may be formed by using the same material as a spacer, a black matrix and the like that is provided on the display substrate. To simplify the manufacture process, the barrier wall may be formed at the same time as the spacer or the black matrix. The height of the barrier wall is not higher than that of the spacer or black matrix, to avoid influence on the cell gap of the liquid crystal panel.

By the above manufacturing method, the groove is provided on the display substrate to limit the sealant so that the sealant can be coated by the injection process. Accordingly, the manufacture efficiency can be improved, the sealant can be saved, the problems such as the sealant hanging, the sealant breakage and poor coating uniformity in the conventional stroke-type coating can be solved, and the defects that the liquid crystal is polluted, the liquid crystal pierces into the sealant and the like can be efficiently prevented.

Therefore, the product yield can be increased and the manufacture efficiency can be improved.

The foregoing embodiments merely are exemplary embodiments of the invention, and not intended to define the scope of the invention, and the scope of the invention is determined by the appended claims.

What is claimed is:

1. A display substrate, comprising a display region and a sealant coating region provided outside the display region, wherein the sealant coating region is provided with a groove to limit a sealant; and wherein the groove is provided in the sealant coating region and forms a rectangular moat surrounding the display region, an inner edge of the rectangular moat is connected end to end to form a closed rectangle surrounding the display region of the display substrate, and an outer edge of the rectangular moat includes a plurality of openings for injecting the sealant into the rectangular moat;

wherein the outer edge is divided into multiple discontinuous parts by the openings;

wherein, the sealant coating comprises two nozzles, and the two nozzles are perpendicular to each other, and a position of the nozzles corresponds to a position of the openings of the groove, and a valve is provided in the nozzle for controlling the sealant injection.

2. The display substrate according to claim 1, wherein a cross section of the groove has a structure which is wide at a top and narrow at a bottom.

3. The display substrate according to claim 2, wherein the cross section of the groove has the structure of an inverted trapezoid or inverted taper.

4. The display substrate according to claim 1, wherein the sealant coating region is provided with more than one groove.

5. A display device, comprising a display substrate according to claim 1.

6. A manufacturing method of a display substrate, wherein the display substrate comprises a display region and a sealant coating region provided outside the display region, and the manufacturing method comprises a step of forming a groove in the sealant coating region of the display substrate to limit sealant, wherein the groove is provided in the sealant coating region and forms a rectangular moat surrounding the display region, an inner edge of the rectangular moat is connected end to end to form a closed rectangle surrounding the display region of the display substrate, and an outer edge of the rectangular moat includes a plurality of openings for injecting the sealant into the rectangular moat;

wherein the outer edge is divided into multiple discontinuous parts by the openings;

wherein, the sealant coating comprises two nozzles, and the two nozzles are perpendicular to each other, and a position of the nozzles corresponds to a position of the openings of the groove, and a valve is provided in the nozzle for controlling the sealant injection.

7. The manufacturing method according to claim 6, wherein the step of forming the groove in the sealant coating region of the display substrate to limit the sealant comprises: etching the display substrate to form the groove in the sealant coating region of the display substrate.

8. The manufacturing method according to claim 7, wherein the etching is a dry etching.

9. The manufacturing method according to claim 6, wherein the step of forming the groove in the sealant coating region of the display substrate to limit the sealant comprises: forming barrier walls opposite to each other in the sealant coating region of the display substrate so that the groove is formed between the opposite barrier walls.

10. The manufacturing method according to claim 9, wherein the barrier walls are formed by SiNx.

11. The manufacturing method according to claim 9, wherein the barrier walls are formed by using a same material as a spacer or a black matrix that is provided on the display substrate, and the barrier walls are formed at a same time as the spacer or the black matrix that is provided on the display substrate.

12. The manufacturing method according to claim 11, wherein a height of the barrier walls is not higher than that of the spacer or black matrix that is provided on the display substrate.

* * * * *